United States Patent [19]

Gruss et al.

[11] Patent Number: 4,769,276

[45] Date of Patent: Sep. 6, 1988

[54] MICA-COATED ELECTRICALLY INSULATING AND FIRE-PROOFING ADHESIVE TAPE ESPECIALLY SUITABLE FOR ELECTRICAL OR OPTICAL FIBER CABLE

[75] Inventors: William Gruss, Les Creuses; René Boulaigre, Issy Les Moulineaux, both of France

[73] Assignee: Alsthom, S.A., Paris, France

[21] Appl. No.: 941,396

[22] Filed: Dec. 15, 1986

[30] Foreign Application Priority Data

Dec. 13, 1985 [FR] France ................................ 85 18497

[51] Int. Cl.[4] ............................ C09J 7/02; B32B 5/16; B32B 19/02

[52] U.S. Cl. .................................... 428/251; 428/324; 428/343; 428/447; 428/454; 428/480; 174/120 C; 174/122 G

[58] Field of Search ............... 428/324, 447, 480, 343, 428/251, 454; 174/122 B, 120 C

[56] References Cited

U.S. PATENT DOCUMENTS

| | | | |
|---|---|---|---|
| 3,539,438 | 11/1970 | Groff | 161/163 |
| 3,867,245 | 2/1975 | Herman | 161/143 |
| 4,381,327 | 4/1983 | Briere | 428/324 X |
| 4,400,676 | 8/1983 | Mitsui | 428/324 X |
| 4,418,241 | 11/1983 | Fujiwara | 428/324 X |
| 4,456,651 | 6/1984 | Pollmeier et al. | 428/324 |
| 4,533,580 | 8/1985 | Otty | 428/324 X |
| 4,540,617 | 9/1985 | Kawanishi et al. | 428/324 X |
| 4,603,088 | 7/1986 | Sklarski et al. | 428/324 X |
| 4,606,785 | 8/1986 | Zeise | 428/324 X |

FOREIGN PATENT DOCUMENTS

| | | |
|---|---|---|
| 1199768 | 1/1986 | Canada . |
| 958339 | 5/1964 | United Kingdom . |
| 1193082 | 5/1970 | United Kingdom . |

*Primary Examiner*—George F. Lesmes
*Assistant Examiner*—D. R. Zirker
*Attorney, Agent, or Firm*—Kenyon & Kenyon

[57] ABSTRACT

The mica-coated adhesive tape comprises at least one sheet of mica paper and at least one backing sheet bonded to the mica paper sheet by means of a binder, the face of the mica paper sheet away from the backing sheet being coated with an adhesive. The adhesive includes an outer coating of a silicone resin.

12 Claims, 1 Drawing Sheet

MICA-COATED ELECTRICALLY INSULATING AND FIRE-PROOFING ADHESIVE TAPE ESPECIALLY SUITABLE FOR ELECTRICAL OR OPTICAL FIBER CABLE

BACKGROUND OF THE INVENTION

This invention concerns a mica-coated electrically insulating and fire-proofing adhesive tape especially suitable for electrical cable and for optical fiber cable, said tape comprising at least one sheet of mica paper and at least one reinforcement or backing sheet bonded to the mica paper sheet by means of a binder, the face of the mica paper sheet away from the reinforcement sheet being coated with an adhesive layer.

SUMMARY OF THE INVENTION

It is the object of the invention to provide a tape with the adhesive layer on the mica paper side and having a very long adhesive life, which can be bonded at any time to a great variety of substrates, which are moreover pressure-sensitive, such that mere contact without pressure does not bring about a bond but that a firm bond is obtained as soon as pressure is applied between the tape and the surface to which it is applied.

The insulating mica-coated tape according to the invention features an adhesive layer comprising a hardenable silicone resin.

The tape according to the invention further preferably embodies at least one of the following characteristics:

the silicone resin is a polysiloxane resin and preferably a methylpolysiloxane resin;

the backing or reinforcing sheet is a glass cloth of between 15 and 90 grams per square meter (gsm) substance weight;

the backing sheet consists of a warp of 5 to 12 strands per centimeter and a yarn count of E.C.5-5.5 to E.C.9-68;

the backing sheet consists of a film, a fabric or a felt of synthetic polymer;

the synthetic polymer is a polyester, a polyimide, a polyamide or a polycarbonate, or polytetrafluoroethylene (PTFE);

the backing sheet is bonded to the mica paper with the help of a polysiloxane resin and added hardening catalyst;

the mica paper sheet is of muscovite or phlogopite mica, preferably of 45 to 200 gsm substance;

the adhesive layer also includes a reinforcing sheet, such that the mica paper sheet is covered on both sides with a reinforcing sheet, only one of which sheets is provided with an adhesive resin;

the adhesive layer includes is a glass cloth of between 15 and 90 gsm substance, a warp comprising 5 to 12 strands per cm of glass yarns of E.C.5-5.5 to E.C.9-68 count, or a film, a fabric or a felt of synthetic polymer coated on one side with an adhesive resin, and on the other side with a binder to the mica paper sheet.

A warp count such as E.C.5-5.5 means a warp formed of E-glass strands, obtained by glass spinning mode C, made up of yarns of 5.5 tex having a diameter of 5 microns.

BRIEF DESCRIPTION OF THE DRAWINGS

The invention will be described in more detail below, in connection with the drawings, in which.

DETAILED DESCRIPTION OF THE PREFERRED EMBODIMENTS

Figure 1:
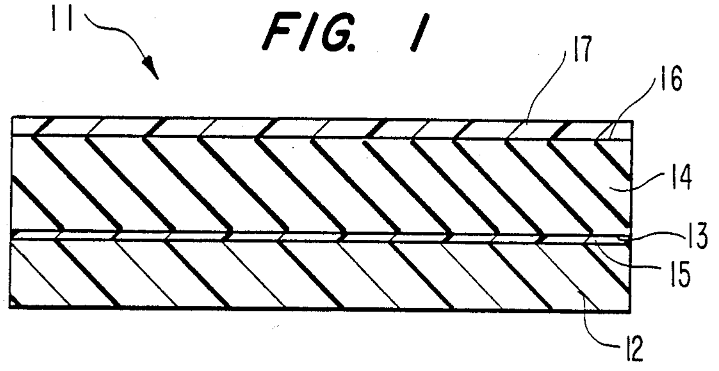
FIG. 1 is a cross section of an electrically insulating adhesive tape according to a first embodiment of the invention.

With reference to FIG. 1, a first embodiment of the invention comprises a multilayer tape 11, viewed in end cross section. The tape includes a reinforcing or backing sheet 12 bonded to one face 13 of a mica paper sheet 14 by means of a binder 15. An opposite face 16 of the mica paper sheet 14 is overcoated by a pressure-sensitive adhesive layer 17 that comprises a silicone resin without a hardening additive.

Figure 2:
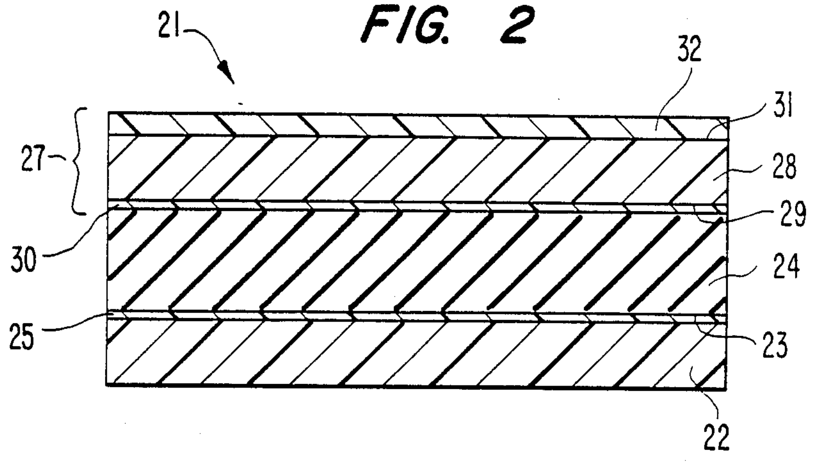
FIG. 2 is a cross section of an electrically insulating adhesive tape according to a second embodiment of the invention.

FIG. 2 shows an alternative embodiment of a multilayer tape 21 in which a reinforcing or backing sheet 22 is bonded to one face 23 of a mica paper sheet 24 by means of a binder 25. An opposite face 26 of the mica paper sheet 24 is overcoated by an adhesive layer 27. Adhesive layer 27 in this embodiment includes an additional reinforcing sheet 28 having one face 29 that is bonded to the opposite face of the mica paper sheet 24 by means of a binder 30 and having an opposite exposed face 31 that is overcoated by a layer 32 comprising a silicone resin without a hardening additive.

Three examples of electrically insulating mica-coated tapes according to the invention, for protecting electrical cables from fire, will now be described.

EXAMPLE 1

A sheet of phlogopite mica paper of 120 gsm substance is laminated on one face, with a binder or methylpolysiloxane synthetic resin containing 2% cobalt naphthenate by weight as a hardening catalyst to a glass cloth of 33 gsm substance, said mica paper being overcoated on an opposite face by the same synthetic resin, but without the hardening additive.

The glass cloth can be replaced by a warp of 5 to 12 strands per cm of 5.5 to 68 tex count and 5 to 9-microns diameter glass yarns, arranged in parallel in the direction of tape unreeling on a synthetic polymer film, particularly a polyester film.

EXAMPLE 2

A sheet of 80 gsm substance phlogopite mica paper is laminated on one face with a binder of methylpolysiloxane synthetic resin containing 2% cobalt naphthenate additive by weight as a hardening catalyst to a polyester film, specifically polyethylene glycol terephthalate 12 microns thick, said mica paper being overcoated on an opposite face by the same synthetic resin without the hardening additive.

EXAMPLE 3

A sheet of 75 gsm substance muscovite mica paper is laminated on both faces, with a binder of methylpolysiloxane resin containing 2% cobalt naphthenate additive by weight, between two 12-micron thick polyester films, one of said two films, intended to be arranged on the side toward the cable jacket to be protected, being overcoated on its exposed face with the same methylpolysiloxane resin without the hardening additive.

As already stated hereinabove, the adhesive layer can include, instead of a silicone resin alone, a glass cloth, a warp of glass yarn strands or a film, a fabric or a felt of synthetic polymer of the same type as the backing sheet mentioned hereinabove, and provided on both of its sides or faces with an adhesive resin, with a catalyst added on the side facing the mica paper sheet.

Although the mica-coated electrically insulating and fire-proof adhesive tape according to the invention is especially suited to the purpose of insulating electrical conductors and optical fiber light guides, it is also applicable to insulating other surfaces in the field of electrotechnology which one wishes to protect against fire, notably in transformers.

What is claimed is:

1. An electrically insulating and fire-proof adhesive tape especially for use with electrical cable and optical fiber cable, the tape comprising:

a first layer having an inner side and an outer side, the first layer including at least one sheet of mica paper;

a backing layer disposed on the outer side of the first layer, the backing layer including at least one reinforcing sheet;

a binder bonding the backing layer to the outer side of the first layer, the binder comprising a polysiloxane resin containing a hardening catalyst additive; and an adhesive layer bonded to the inner side of the first layer, the adhesive layer comprising an exposed pressure-sensitive adhesive coating of a hardenable silicone resin without a hardening additive, such that the coating is capable of retaining pressure-sensitive adhesivity over a long time.

2. An adhesive tape according to claim 1 wherein said silicone resin is a polysiloxane resin.

3. An adhesive tape according to claim 2 wherein said polysiloxane resin is a methylpolysiloxane resin.

4. An adhesive tape according to claim 1 or 2 or 3 wherein the reinforcing sheet comprises a glass cloth having a density of between 15 and 90 gsm.

5. An adhesive tape according to claim 1 or 2 or 3 wherein the reinforcing sheet comprises a warp of 5 to 12 strands per centimeter and of E.C. 5-5.5 to E.C. 9-68 count.

6. An adhesive tape according to claim 1 or 2 or 3 wherein the reinforcing sheet is a synthetic polymer sheet selected from the group consisting of a film, a fabric, and a felt.

7. An adhesive tape according to claim 6 wherein the synthetic polymer is selected from the group consisting of a polyester, a polyimide, and a polycarbonate.

8. An adhesive tape according to claim 1 or 2 or 3 wherein said mica paper sheet is selected from the group consisting of phlogopite and muscovite mica.

9. An adhesive tape according to claim 8 wherein said mica paper sheet has a density of 45 gsm to 200 gsm.

10. An adhesive tape according to claim 1 or 2 or 3 wherein said adhesive layer further comprises a glass cloth having a density of 15 to 90 gsm disposed on the first layer side of said coating and a binder bonding the glass cloth to the inner side of the first layer.

11. An adhesive tape according to claim 1 or 2 or 3 wherein said adhesive layer further comprises a warp of 5 to 12 strands per centimeter of E.C. 5-5.5 to E.C. 9-68 count glass yarns disposed on the first layer side of said coating and a binder bonding the warp to the inner side of the first layer.

12. An adhesive tape according to claim 1 or 2 or 3 wherein said adhesive layer further comprises a synthetic polymer sheet selected from the group consisting of a film, a fabric, and a felt disposed on the first layer side of said coating and a binder bonding the synthetic polymer sheet to the inner side of the first layer.

* * * * *